Dec. 2, 1930.  A. C. MARSHALL  1,783,735
COUPLING OR CLAMP FOR SCAFFOLDING OR OTHER PURPOSES
Filed March 14, 1929  2 Sheets-Sheet 1
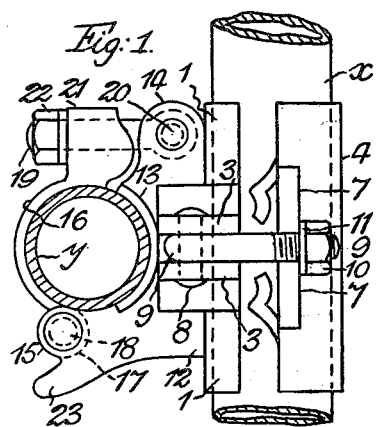
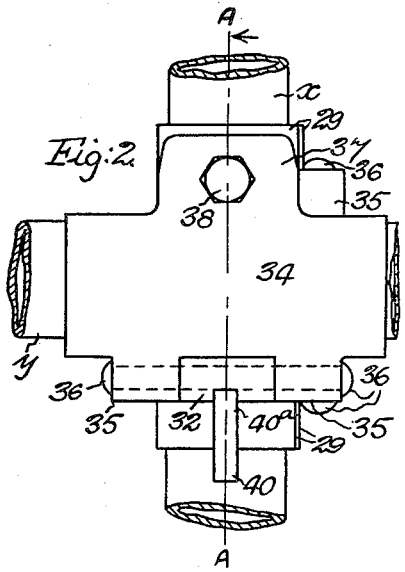
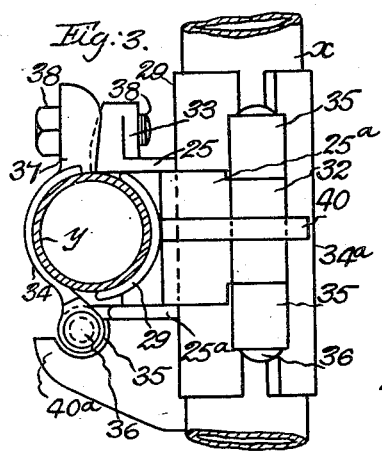
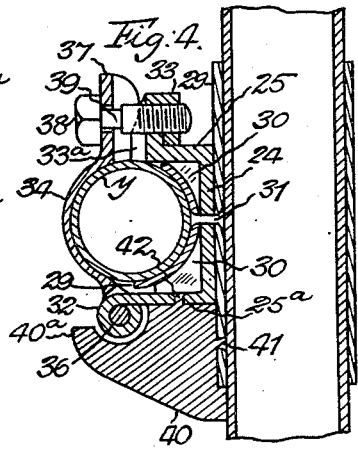
Inventor;
Arnold Clarence Marshall,
By his Att'y,

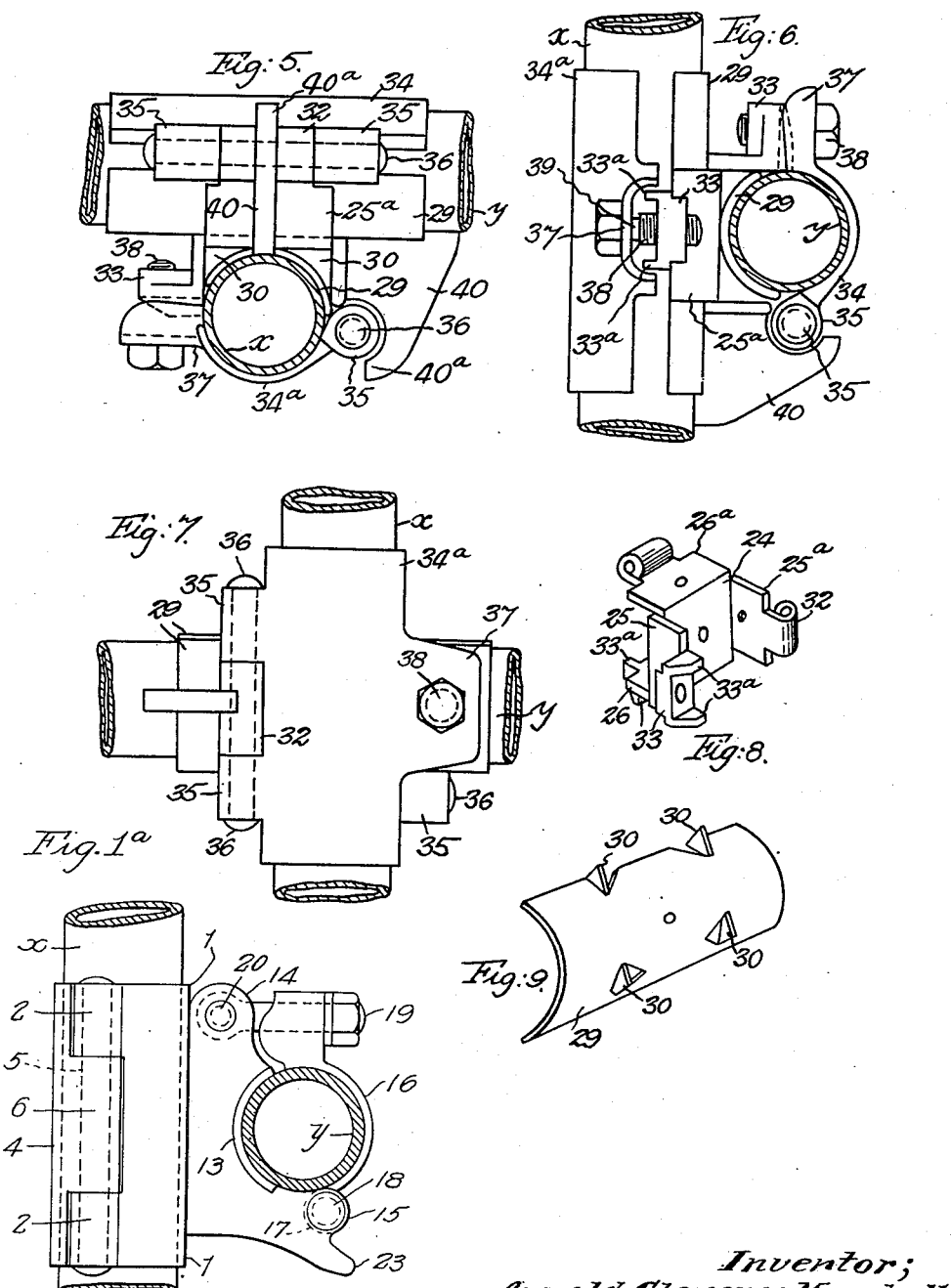

Patented Dec. 2, 1930

1,783,735

UNITED STATES PATENT OFFICE

ARNOLD CLARENCE MARSHALL, OF LONDON, ENGLAND, ASSIGNOR TO THE STEEL SCAF-
FOLDING COMPANY LIMITED, OF LONDON, ENGLAND, A CORPORATION OF GREAT
BRITAIN

COUPLING OR CLAMP FOR SCAFFOLDING OR OTHER PURPOSES

Application filed March 14, 1929, Serial No. 346,930, and in Great Britain July 3, 1928.

This invention relates to couplings or clamps designed for securing two parts in angular relationship one to the other, for example for securing a putlog to a scaffold pole.

A coupling or clamp according to this invention comprises two parts each embodying one relatively rigid element and a movable element, the said movable element serving to clamp the pole or other body to the rigid element.

According to one form of the invention, the device comprises a body in the form of a plate having a curved surface preferably provided with projections upon each side thereof and adapted to partially surround the body to which it is applied. Pivotally connected to said body is a cap having a curved inner surface, said cap being adapted to cooperate with the curved surface upon the body of the device, and having at its outer or free end suitably spaced lugs or ears between which passes an eye-bolt secured to lugs upon the body of the device the aforesaid lugs being so disposed that when the nut is upon the bolt its outer end does not project beyond the plane of the outer surface of the said cap.

Secured to the body of the device and running parallel with the length of the aforesaid plate, and therefore at a right angle to the line of the body held by the first clamping member, is a body of substantially semi-circular cross sectional outline from which project suitably spaced lugs or ears adapted to retain a pin carrying an eye-bolt. The aforesaid eye-bolt is preferably disposed at or near the centre of the length of the semi-circular body projecting therefrom at a right angle to the line thereof.

Disposed upon the opposite side of the plate and formed upon the semicircular body are other lugs or ears carrying a pin by which there is pivotally connected to them, by means of lugs thereon, a cap of semicircular cross-sectional outline, said cap having lugs thereon to engage the aforesaid eye-bolt. The lugs just referred to are also so arranged that the nut upon the eyebolt does not project beyond the plane of the outer surface of the cap.

Arranged adjacent the lugs of the respective cap portions of the device are horn shaped extensions upon which the said cap members may rest when open, said extensions serving to support the said caps in a position such that they serve as rests for the bodies to be inserted in the coupling or clamp.

The height of the horned shaped projections is such that their upper ends do not project beyond the plane of the top of the cap when same is in the closed position.

For purposes of manufacture it may be found more convenient, instead of forming the main clamp members as a unitary structure, for instance as a casting to form these in two or more parts riveted or otherwise connected together.

In order that the invention may be the better understood drawings are appended in which:—

Fig. 1 is a side view showing one form of construction of a coupling or clamp according to the present invention.

Fig. 1A is a side view of the clamp shown in Fig. 1 looking from the opposite side from the one of which Fig. 1 is a view.

Fig. 2 is a front view showing an alternative form of construction.

Fig. 3 is a view of the clamp shown in Fig. 2 as seen from the right hand side.

Fig. 4 is a section on line A—A Fig. 2.

Fig. 5 is a plan of the clamp as seen from the underside.

Fig. 6 is a view as seen from the left hand side.

Fig. 7 is a rear view.

Fig. 8 is a perspective view showing a certain detail.

Fig. 9 is a perspective view showing a further detail.

Referring to the accompanying drawings $x$ and $y$ indicate scaffold poles or other structural members disposed at a right angle with respect to each other.

The form of clamp shown in Fig. 1 comprises a curved plate 1 designed to partially surround the pole $x$ and provided upon its sides with pairs of drilled lugs disposed in spaced relationship and indicated respectively by 2, 2, and 3, 3.

4 indicates a substantially semicircular member also designed to partially surround the pole $x$, and hingedly connected at one side to the plate 1, this connection being effected by means of a pin 5 which passes through the lugs 2, 2, and a lug 6 upon one side of the plate 4.

Disposed upon the other side of the plate 4 are lugs 7, 7, and passing through the lugs 3, 3, is a pin 8 mounted upon which is an eye-bolt 9 the outer end of which is of such size as to permit it to pass between the lugs 7, 7, a nut 10 being provided by means of which the plate 4 may be drawn to the plate 1 and thus firmly clamp the pole $x$, a washer 11 being interposed between the nut 10 and the lugs 7.

Secured to or formed integral with the plate 1 is a plate 12 provided with a curved portion 13 formed integral therewith and adapted to partially surround the pole $y$ the said plate being provided at its upper and lower ends with pairs of suitably spaced lugs such as 14 and 15.

16 indicates a curved plate which partially surrounds the pole $y$, and which is provided at its lower end with a drilled lug 17 through which passes a pin 18 carried by the aforementioned lugs 15 and whereby the said plate 16 is hingedly connected to the plate 12.

19 indicates an eye-bolt mounted upon a pin 20 carried by the lugs 14, the said eye-bolt passing at its outer end between lugs indicated by 21 and formed upon the upper end of the plate 16, a nut 22 being provided upon the end of the eye-bolt whereby the said plate 16 is drawn to the plate 12 to clamp the pole $y$.

Arranged adjacent the lugs 15 of the plate 12 are horn shaped extensions such as 23 upon which the plate 16 may rest when open, said extension serving to support the said plate in a position such that it serves as a rest for the bodies to be inserted in that part of the clamp. Extensions similar to the extensions 23 may be provided upon the lugs 2, 2.

As previously stated, instead of forming the body of the device as a unitary structure it may, for convenience of production, be formed in two or more parts. A form of construction, such as just referred to, is shown in Figs. 2 to 9, where 24 (shown most clearly in Fig. 8) indicates a plate provided upon its sides with two pairs of projections indicated by 25, 25ª, and 26, 26ª respectively, the said pairs of projections extending oppositely and at a right angle from said plate, and being situated one upon either side thereof.

29, 29 indicate curved plates disposed adjacent each face of the plate 24, and between the respective pairs of projections 25, 25ª and 26, 26ª, the said plates being provided with lugs 30, which are formed integral therewith or are punched therefrom as shown in Fig. 9, the said lugs being of such shape that when the plates 29 are placed in position they serve to support and maintain the plates in the correct position.

The plates 29, 29 are secured to the plate 24 by means of a rivet 31, Fig. 4 the said plates being of such shape as to partially surround the poles $x$ and $y$ when the clamp is in position.

Disposed upon the outer ends of the projections 25ª and 26ª, and formed integral therewith are eyes 32, and formed upon the outer ends of the projections 25 and 26 are lugs 33 drilled as shown. 34, 34ª indicate curved bodies or caps which respectively partially surround the poles $y$ and $x$, and which are each provided with drilled lugs 35, whereby the said bodies are hingedly connected to the projections 25 and 25ª respectively by means of pins 36 which pass through the lugs 35 and the aforementioned eyes 32.

37, 37 indicate projections of substantially U shaped cross-sectional outline formed integral with the cap pieces 34, 34ª, and through which projections pass bolts 38, the inner ends of said bolts being designed to engage with screw threads formed in the lugs 33, whereby when the said bolts are screwed into the lugs 33, the cap pieces 34 and 34ª are drawn towards the plates 29 to securely clamp the respective poles $x$ and $y$.

Disposed upon each of the lugs 33 are projections such as 33ª, shown in Figs. 6 and 8, the purpose of said projections being to grip the respective poles when the clamp is in use. This additional gripping effect being produced by the tendency of the lugs 33 to spring or flex slightly under the tension of the bolts 38. The limbs of the U shaped projections 37, 37, are designed to also grip the respective pole in a similar manner. In order that the bolts 38 shall not become detached from the projection 37, they are each reduced in diameter at their upper ends as indicated at 39, Figs. 4 and 6, and the perforations in the said projections through which the said bolts pass are punched or pressed in a manner such as to form a burr which is turned back after the bolts have been placed in position. By this means the bolts are permitted a certain amount of longitudinal movement but cannot be withdrawn from the projections.

40 indicate plates riveted, as indicated at 41 and 42, to the plates 29 and the projections 25ª and 26ª respectively of the plate 24, the said plates 40 being provided at their outer extremities with horn shaped portions 40ª upon which the bodies 34 and 34ª may rest when the clamp is open, whereby the said bodies are supported in such a position that they serve as rests for the bodies to be inserted in the coupling or clamp.

Claims.

1. A clamp for the purpose specified comprising a body having a plane portion of rectangular outline, a pair of projections upon opposite edges of said body disposed at a right angle thereto and projecting in one direction, a pair of projections upon the other opposite edges of said body also projecting at a right angle thereto but in an opposite direction to said first projections, a projection disposed at a right angle to the plane of one of each pair of said projections at the outer end thereof, projections upon and disposed at a right angle to said last projections and having surfaces adapted to bite into the body gripped, a body pivotally mounted upon one of said first projections to engage the bodies to be gripped, a screw for forcing each of said bodies forming parts of said clamp onto the body gripped, and a threaded part on one of said bodies forming parts of said clamp for said screw to be engaged therein.

2. A clamp for the purpose specified comprising a body having a plane portion of rectangular shaped outline, a pair of projections upon opposite edges of said body disposed at a right angle thereto and projecting in one direction, a pair of projections upon the other opposite edges of the body also projecting at a right angle thereto but in an opposite direction to said first projections, a projection upon and disposed at a right angle to the plane of one of each pair of said projections at the outer end thereof, projections disposed at a right angle to said last projections and having surfaces adapted to bite into the body gripped, a plate having a curved surface designed to engage the inner portion of the periphery of the body gripped, means for securing said plate to the rectangular body first referred to, a body pivotally mounted upon one of each of said first projections to engage the body to be gripped, a screw for forcing said pivoted body on to the body gripped and a threaded part on one of said bodies forming parts of said clamp for said screw to be engaged therein.

3. A clamp for the purpose specified comprising a body having a plane portion of rectangular outline, a pair of projections upon opposite edges of said body disposed at a right angle thereto and projecting in one direction, a pair of projections upon the other opposite edges of said body also projecting at a right angle thereto but in an opposite direction to said first projections, a projection disposed at a right angle to the plane of one of each pair of said projections at the outer end thereof, projections upon and disposed at a right angle to said last projections and having surfaces adapted to bite into the body gripped, bodies each pivotally mounted upon one of said pairs of projections to engage the bodies to be gripped, a screw for forcing each of said bodies forming parts of the clamp onto the body gripped and a threaded part on one of said bodies forming parts of said clamp for said screw to be engaged therein, and means for supporting one of the pivotally mounted bodies in a position such that it serves as a support for the body to be gripped preparatory to placing it in position to be gripped.

4. A clamp for the purpose specified comprising a body having a plane portion of rectangular shaped outline, a pair of projections upon opposite edges of said body disposed at a right angle thereto and projecting in one direction, a pair of projections upon the other opposite edges of the body also projecting at a right angle thereto but in an opposite direction to said first projections, a projection upon and disposed at a right angle to the plane of one of each pair of said projections at the outer end thereof, projections disposed at a right angle to said last projections and having surfaces adapted to bite into the body gripped, a plate having a curved surface designed to engage the inner portion of the periphery of the body gripped, means for securing said plate to the rectangular body first referred to, bodies each pivotally mounted upon one of each of said pairs of projections to engage the body to be gripped, a screw for forcing each of said bodies forming parts of the clamp onto the body gripped and a threaded part on one of said bodies forming parts of the clamp for said screw to be engaged therein, and means for supporting each pivotally mounted body in a position such that it serves as a support for the corresponding body to be gripped preparatory to placing it in position to be gripped.

5. A clamp for the purpose specified comprising a body having a plane portion of rectangular outline, projections upon opposite edges of said body disposed at a right angle thereto and projecting in one direction, projections upon the other opposite edges of said body also projecting at a right angle thereto but in an opposite direction to said first projections, a projection disposed at a right angle to the plane of one of each of said projections at the outer end thereof, projections upon and disposed at a right angle to said last projections and having surfaces adapted to bite into the body gripped, bodies pivotally mounted upon one of each of said first and second projections to engage the body to be gripped, a projection upon each of said bodies, a perforation in said projection, a screw passing through said perforation, a screw-threaded perforation in the projection carrying the biting surfaces and designed to be engaged by said screw whereby the pivoted member is caused to press the body gripped against said biting surfaces.

6. A clamp for the purpose specified comprising a body having a plane portion of rectangular shaped outline, a pair of projections upon opposite edges of said body disposed at a right angle thereto and projecting in one direction, a pair of projections upon the other opposite edges of the body also projecting at a right angle thereto but in an opposite direction to said first projections, a projection upon and disposed at a right angle to the plane of one of each pair of said projections at the outer end thereof, projections disposed at a right angle to said last projections and having surfaces adapted to bite into the body gripped, a plate having a curved surface designed to engage the inner portion of the periphery of the body gripped, means for securing said plate to the rectangular body first referred to, bodies pivotally mounted each upon one of each of said pairs of projections to engage the body to be gripped, a projection upon each of said pivoted bodies, a perforation in said projection, a screw passing through said perforation, a screw-threaded perforation in each projection carrying the biting surfaces and designed to be engaged by said screw whereby the pivoted member is caused to press each body gripped against said biting surfaces.

7. A clamp for the purpose specified comprising a body having a plane portion of rectangular shaped outline, a pair of projections upon opposite edges of said body disposed at a right angle thereto and projecting in one direction, a pair of projections upon the other opposite edges of the body also projecting at a right angle thereto but in an opposite direction to said first projections, a projection upon and disposed at a right angle to the plane of one of each pair of said projections at the outer end thereof, projections disposed at a right angle to said last projections and having surfaces adapted to bite into the body gripped, a plate having a curved surface designed to engage the inner portion of the periphery of the body gripped, means for securing said plate to the rectangular body first referred to, bodies pivotally mounted upon one of each of said pairs of projections to engage the body to be gripped, a projection upon each of said pivoted bodies, a perforation in said projection, a screw passing through said perforation, a screw-threaded perforation in the projection carrying each biting surface and designed to be engaged by said screw whereby each pivoted member is caused to press the body gripped against said biting surfaces, and means for supporting each pivotally mounted body in a position such that it serves as a support for the body to be gripped preparatory to placing it in position to be gripped.

In testimony whereof I have hereunto set my hand.

ARNOLD CLARENCE MARSHALL.